United States Patent [19]

Inoue et al.

[11] Patent Number: 5,369,750
[45] Date of Patent: Nov. 29, 1994

[54] METHOD AND APPARATUS FOR CONFIGURING MULTIPLE ABSOLUTE ADDRESS SPACES

[75] Inventors: Taro Inoue, Sagamihara; Hidenori Umeno, Kanagawa; Shunji Tanaka, Sagamihara; Tsuyoshi Watanabe, Hadano, all of Japan

[73] Assignee: Hitachi, Ltd., Tokyo, Japan

[21] Appl. No.: 743,754

[22] Filed: Aug. 12, 1991

[30] Foreign Application Priority Data

Aug. 15, 1990 [JP] Japan .................. 2-215300

[51] Int. Cl.⁵ .................. G06F 12/00; G06F 12/10
[52] U.S. Cl. .................. 395/400; 364/228.1; 364/228.2; 364/256.3; 364/256.4; 364/DIG. 1
[58] Field of Search .................. 395/400, 425

[56] References Cited

U.S. PATENT DOCUMENTS

| 4,494,189 | 1/1985 | Bean et al. ............... 395/400 |
| 4,564,903 | 1/1986 | Guyette et al. ........... 395/400 |
| 4,674,038 | 6/1987 | Brelsford et al. ......... 395/550 |
| 4,792,895 | 12/1988 | Tallman ................ 395/375 |
| 4,843,541 | 6/1989 | Bean et al. ............... 395/400 |
| 5,129,071 | 7/1992 | Yamagata et al. ........ 395/400 |
| 5,230,069 | 7/1993 | Brelsford et al. ......... 395/400 |

FOREIGN PATENT DOCUMENTS

| 61-133453 | 6/1986 | Japan . |
| 64-17128 | 3/1989 | Japan . |
| 02-33639 | 11/1990 | Japan . |

Primary Examiner—Joseph L. Dixon
Assistant Examiner—Michael A. Whitfield
Attorney, Agent, or Firm—Fay, Sharpe, Beall, Fagan, Minnich & McKee

[57] ABSTRACT

A method and an apparatus for configuring multiple absolute address spaces are disclosed which simultaneously operate a plurality of virtual machines (VMs) respectively having operating systems on a single real computer by allocating a plurality of logical address spaces to an absolute address space. A different absolute address space is allocated to each of the VMs, whereby the respective VMs can access a main storage with a designated address without adding a constant to the designated address.

7 Claims, 11 Drawing Sheets

| ABSOLUTE ADDRESS SPACE | | FLOATING ADDRESS REGISTER | | | | MSU |
|---|---|---|---|---|---|---|

MSE# 0 1 2 3
1 [ ][ ][ ][ ]

VM1 [GUEST MS]

MSE# 0 1
2 [ ][ ]

VM2 [GUEST MS]

MSE# 0 1 2
3 [ ][ ][ ]

VM3 [GUEST MS]

MSE# 0 1
4 [ ][ ]

VM4 [GUEST MS]

| SPACE NUMBER | MSE# | MSU# | Valid |
|---|---|---|---|
| 1 | 0 | 0 | 1 |
| 1 | 1 | 1 | 1 |
| 1 | 2 | 2 | 1 |
| 1 | 3 | 3 | 1 |
| ⋮ | | | |
| 1 | E | – | 0 |
| 2 | 0 | 4 | 1 |
| 2 | 1 | 5 | 1 |
| 2 | 2 | – | 0 |
| 2 | 3 | – | 0 |
| ⋮ | | | |
| 2 | E | – | 0 |
| 3 | 0 | 6 | 1 |
| 3 | 1 | 7 | 1 |
| 3 | 2 | 8 | 1 |
| ⋮ | | | |
| 3 | E | – | 0 |
| 4 | 0 | 9 | 1 |
| 4 | 1 | 10 | 1 |
| ⋮ | | | |
| 4 | E | – | 0 |

MSU:
0
1
2
3
4
5
6
7
8
9
10

FIG. 10

ABSOLUTE ADDRESS SPACE

FLOATING ADDRESS REGISTER (FAR)

| SPACE NUMBER | MSE# | MSU# | Valid |
|---|---|---|---|
| 1 | 0 | 0 | 1 |
| 1 | 1 | 1 | 1 |
| 1 | 2 | 2 | 1 |
| 1 | 3 | 3 | 1 |
| ⋮ | | | |
| 1 | E | — | 0 |
| 2 | 0 | 4 | 1 |
| 2 | 1 | 5 | 1 |
| 2 | 2 | 9 | 1 |
| 2 | 3 | 10 | 1 |
| ⋮ | | | |
| 2 | E | — | 0 |
| 3 | 0 | 6 | 1 |
| 3 | 1 | 7 | 1 |
| 3 | 2 | 8 | 1 |
| ⋮ | | | |
| 3 | E | — | 0 |
| 4 | 0 | 9 | 0 |
| 4 | 1 | 10 | 0 |
| ⋮ | | | |
| 4 | E | — | 0 |

| MSU |
|---|
| 0 |
| 1 |
| 2 |
| 3 |
| 4 |
| 5 |
| 6 |
| 7 |
| 8 |
| 9 |
| 10 |

METHOD AND APPARATUS FOR CONFIGURING MULTIPLE ABSOLUTE ADDRESS SPACES

BACKGROUND OF THE INVENTION

1. Field of the Invention

The present invention relates to a method of allocating a plurality of absolute address spaces for software and an apparatus for dynamically reconfiguring a main storage for a guest computer (hereinbelow simply referred to as "GUEST") in a virtual computer system.

2. Description of the Related Art

A uniform management of resources provided for a computer has a limit to increase users, so that a method has been created for dividing the resources into small groups and reconfiguring them (referred to as "a virtual machine system"). This method is adapted to enable a plurality of logical computers, that is, virtual machines (hereinbelow simply referred to as "VM") to simultaneously operate on a single real computer. With increasing utilization of such a system, kinds and number of the VMs to be operated may be changed in the daytime and at night. For such an operation, it is thought that a computer resource, for example, a main storage, occupied by a VM which uses it only in the daytime but not at night, be provided for another VM at night and returned to the original state in the next morning, thereby utilizing the resource more effectively. A system of dynamically reconfiguring a main storage of a VM as mentioned above is disclosed, for example, in "System of dynamically allocating a domain region in a VM" described in JP-A-64-17128.

In the system described in the above-mentioned JP-A-64-17128, the following four steps of processing are performed to dynamically reconfigure a main memory in a VM:

(a) a host computer (hereinbelow simply called "HOST") logically stops a CPU;

(b) the HOST stops input/output units;

(c) the HOST moves contents of a memory; and (d) the HOST modifies contents of a register for checking the validity of an address value when the CPU is to access the memory and contents of a register for checking the validity of an address value when a channel is to access the memory. However, the above-mentioned JP-A-64-17128 does not describe any specific method for stopping input/output units as stated in step (b).

Figure 14:
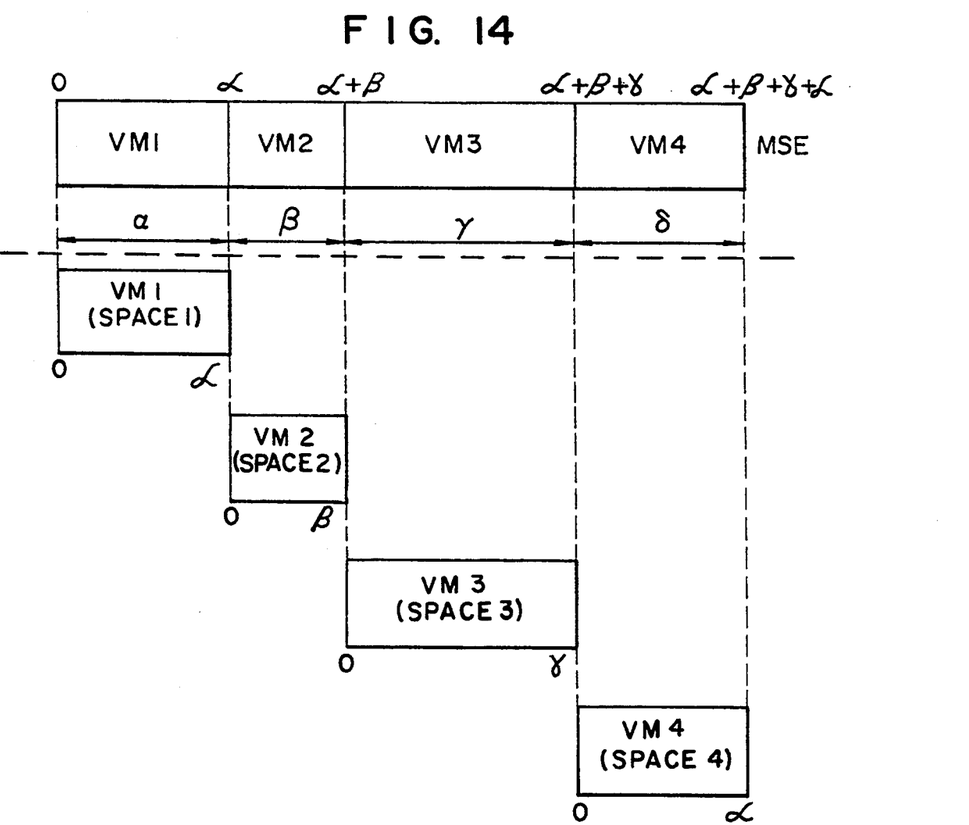
FIG. 14 is a diagram illustrating the relationship between a main storage configuration unit (MSE) and absolute address spaces in a prior art system and a system formed in accordance with the present invention.

On the other hand, there has been proposed a system which provides a sequential region in a main memory disposed in a host real computer as a main storage for a VM (a resident VM system). In this type of VM, for accessing the main storage, an instruction processor adds an address displacement of the sequential region provided for the VM to a designated address to determine the address to be accessed in the main storage. Also, for executing a channel program created by an operating system (OS) of the VM, an input/output processor accesses channel command words (CCW) adding the address displacement to a designated address, and the channel program is executed while the address displacement is added to data addresses of the channel command words. Specifically explaining with reference to FIG. 14 (above the dashed line), when a resident VM is configured by allocating a capacity from the address 0 to $\alpha$ of a main storage provided for a real computer to virtual machine VM1, a capacity from the address next to $\alpha$ to $\beta$ to a virtual machine VM2, a capacity from the address next to $\beta$ to $\gamma$ to a virtual machine VM3, and a capacity from the address next to $\gamma$ to $\delta$ to a virtual machine VM4, a given address can be used as it is for accessing the virtual machine VM1 in the main memory. However, it is necessary to add an address displacement $\alpha$ to a given address for accessing the virtual machine VM2, an address displacement $(\alpha+\beta)$ for accessing the virtual machine VM3, and an address displacement $(\alpha+\beta+\gamma)$ for accessing the virtual machine VM4.

A floating address register has conventionally been employed for establishing the correlation between an absolute address recognized by the OS and a corresponding physical address in the main storage. The floating address register is provided for every configuration unit of the main storage for storing a unit number (a physical substance) of the main storage corresponding to each configuration unit. By modifying the corresponding unit number of the main storage, different physical entities can be correlated to a single absolute address.

A related invention to the present invention has already been made and is referred to in JP-A-2-33639 the contents of which is incorporated herein by reference.

SUMMARY OF THE INVENTION

It is an object of the present invention to provide a method and an apparatus for configuring multiple absolute address spaces capable of dynamically reconfiguring a main storage of a VM without moving a main storage region of the VM on an absolute address space.

The above object has been determined on the basis of the following problems recognized with respect to the prior art.

Suppose now that a main storage is dynamically reconfigured in a VM implemented by the resident VM system. There may be employed an operation form, for example, where a main storage which is not used at night is used as a part of another VM at night and returned to the original state in the next morning, as mentioned above. Here, a dynamic reconfiguration means that IPL (Initial Program Loading) for the OS on the VM is not needed again.

It is assumed, for example, that virtual machines VM1, VM2 and VM3 constituting a resident VM system exist sequentially from the smallest address of a main storage of a host. When the operation of the virtual machine VM3 has been terminated, if a free storage area allocated to the virtual machine VM3 is to be additionally given to the virtual machine VM1, such a reconfiguration cannot be immediately carried out since the virtual machines VM1 and VM3 are not located contiguous to each other. This is because in the resident VM system a main storage region of a VM must be located in a contiguous manner on a main storage of the HOST. Therefore, the region allocated to the virtual machine VM2 is first moved to the region of the virtual machine VM3 to create a free area contiguous to the virtual machine VM1. This movement can be logically performed by modifying contents of a floating address register, so that a physical data movement between memories need not be carried out.

With the movement of the virtual machine VM2, it is also necessary to modify an address displacement of the VM registered in an input/output processor. However, a data transfer may possibly be performed by the virtual machine VM2 in course of the above-mentioned movement between the virtual machines VM2 and VM3, so that the address displacement need be modified in synchronism with a change in contents of the floating address register for executing the data movement without incurring any contradiction. However, it takes a quite long time to modify the contents of the floating address register, thereby making it extremely difficult to achieve a modification in the address displacement in synchronism with a change in the contents of the floating address register.

Further, the aforementioned JP-A-64-17128 shows a system of moving the entire virtual machine VM1 to an area where the virtual machine VM3 has previously existed, which implies a problem, similarly to the above-mentioned prior art, that a modification in an address displacement is difficult to be performed in synchronism with a change in contents of the floating address register.

To achieve the above object, the method of configuring multiple absolute address spaces according to an aspect of the present invention is featured in that:

(a) different absolute address spaces are allocated to respective VMs, and each of the VMs, when accessing a main storage, employs a designated address without adding a constant value to the designated address;

(b) for allowing a HOST to allocate a different absolute address space to each of the VMs, when one of the VMs is to run, the number of an absolute address space allocated to the one VM is set to a region in a main storage for storing information on the one VM and to a subchannel corresponding to a unit occupied by the one VM;

(c) an absolute address space used by the OS for performing an input/output operation is designated by using the operand of an input/output start instruction; and (d) an absolute address space used by the OS for performing an input/output operation is designated by using a channel command word designated by an input/output instruction.

The multiple absolute address space configuring apparatus according to another aspect of the present invention is featured in that:

(e) a means for allocating a plurality of absolute address spaces to an OS, means for establishing a correlation between an absolute address and a physical substance of a main storage is provided corresponding to each of absolute address spaces;

(f) the means for establishing a correlation between an absolute address and a physical substance of a main storage is a floating address register for registering therein a set of an absolute address space number, a valid bit indicating that the space number is valid, and a main storage number corresponding to the space number;

(g) for modifying contents of the means for establishing a correlation between an absolute address and a physical substance of a main storage, an absolute address space number to be modified, a configuration unit of main storage (a main storage element) corresponding to the absolute address space number, and a physical substance number of the main storage unit are designated by using a general register designated by a part of a service processor (SVP) call instruction and a control table which is contents of the general register;

(h) means (e.g. a control register) for designating one of the absolute address spaces and means for designating an absolute address space in which exists an address translation table used for an address translation are also provided; and (i) means for designating an absolute address space in which exists an address translation table used for an address translation, means for accessing the address translation table existing in the absolute address space, and means for correlating the translation result derived by accessing the address translation table and a designated absolute address space are further provided.

For allocating a plurality of absolute address spaces, the present invention provides a floating address register which includes a field for storing an absolute address space identifier such that the floating address register stores information corresponding to each absolute address space. The floating address register shows a correlation between an absolute address recognized by an OS on a computer and a physical substance of a main storage and such a correlation is provided for each absolute address space. The floating address register, however, is not necessarily employed, and another type of register may be alternatively used as long as it can establish a correlation between an absolute address and a physical substance of the main storage corresponding thereto.

When a HOST allocates these absolute address spaces to respective VMs, identifiers of allocated absolute address spaces are set to a state description, and the VMs are dispatched, whereby the VMs can use absolute address spaces independently of one another. The HOST may be implemented either by a control program in the form of software (that is, a VM monitor) or, of course, by hardware. All accesses from an instruction processor of the VM to the main storage are performed with the absolute address space identifier. Also, all accesses from an input/output processor to the main storage unit, for an input/output operation, are also performed with the absolute address space identifier by setting the number of a used absolute address space to a subchannel.

It is therefore sufficient, for reconfiguring a main storage region allocated to a VM, to modify the correlation between an absolute address stored in the floating address register and a physical substance of the main storage. In other words, storage regions for other VMs need not be moved on the absolute address space.

On the other hand, when a plurality of absolute address spaces are used by an OS on a bare machine, one of the absolute address spaces to be used is designated by a control register, and another absolute address space which includes an address translation table used for an address translation is designated by the control register. For performing an address translation, an address translation table in a designated absolute address space is accessed, and the result of the address translation is related to the designated absolute address space. By thus making it possible to designate an absolute address space for use in an input/output operation by using an operation request block (ORB) which is an operand of an input/output start instruction and a channel command word (CCW) designated by the input/output start instruction, the main storage is accessed with an absolute address space number even from an instruction processor and an input/output processor.

BRIEF DESCRIPTION OF THE DRAWINGS

The objects and features of the invention will best be understood from a detailed description of a preferred embodiment thereof, selected for purposes of illustration and shown in the accompanying drawings, in which.

DESCRIPTION OF THE PREFERRED EMBODIMENTS

An embodiment of the present invention will hereinbelow be described in detail with reference to the accompanying drawings.

The present invention is adapted to allocate a plurality of absolute address spaces, and for this purpose a floating address register is provided so as to store information corresponding to each absolute address space. By thus allocating absolute address spaces independently of one another to respective VMs, V=R VM whose guest real address ("V") is equal to host real address ("K") is satisfied for a plurality of VMs. In other words, a VM has a V (an absolute address on a VM) equal to an R (an absolute address on a real machine). Specifically explaining with reference to FIG. 14 (below the dashed line), if a capacity $\alpha$ of a main storage unit (MSU) is allocated to a virtual machine VM1, a capacity $\beta$ to a virtual machine VM2, a capacity $\gamma$ to a virtual machine VM3, and a capacity $\delta$ to a virtual machine VM4, sequentially from the smallest value of the real addresses of the main storage unit, the virtual machines VM1, VM2, VM3 and VM4 are respectively provided with absolute address spaces so that the original address of each of the absolute addresses is "0". it is not therefore necessary, for accessing each of the storage regions, to add an address displacement to a given address as the prior art, whereby the storage region can be accessed with the given address as it is.

If a plurality of absolute address spaces are used by an OS on a bare machine, one of the absolute address spaces to be used is designated by a control register, and another absolute address space which includes an address translation table used for address translation is designated by the control register. For performing address translation, the address translation table in a designated absolute address space is accessed, and the result of the address translation is related to the designated absolute address space. By thus making it possible to designate an absolute address space for use in an input/output operation by using an operation request block (ORB) which is an operand of an input/output start instruction and a channel command word (CCW) designated by the input/output start instruction, the main storage unit is accessed with an absolute address space number also from an instruction processor and an input/output processor.

In the prior art method, for allocating a region 3 to a region 1 in a VM, the region 1 is not located contiguous to the region 3 in an absolute address space of a main storage, whereby a dynamic reconfiguration is not allowed. For this reason, a main storage region of the region 2 is moved by $\gamma+\beta$ to make a free area contiguous to the region 1, and the region 3 is moved to the thus acquired free area to thereby reconfigure the VM. The reconfiguration can be thus carried out so as to increase the main storage region of a GUEST.

If the method according to the present invention is used for reconfiguring a region contiguous to the main storage region of the guest, the region 2 is allocated to the region 1, so that the reconfiguration is carried out without any movement between regions. Stated another way, the region 2 occupying from $\gamma+\alpha$ to $\gamma+\beta$ on the absolute address space may be added to the region 1 from $\gamma$ to $\gamma+\alpha$ on the absolute address space to reconfigure the region 1 having an absolute address region from $\gamma$ to $\gamma+\beta$.

Also, when the method of the present invention is used to reconfigure a region remote from the main storage area of the GUEST, even if a region contiguous to the region 1 is the region 2, a remote free region is allocated as an extended region for the region 1. On the real address space, the region 1 is allocated in a region ranging from $\gamma$ to $\gamma+\alpha$ of the main storage, however, since the region 1 has an independent absolute address space from 0 to $\alpha$, an available or idle area from $\delta$ to $\delta+\beta-\alpha$ on the real address is registered as it is in the region 1 as an extended portion of the region 1, whereby the available area can be accessed with the absolute addresses from $\alpha$ to $\beta$.

Figure 1:
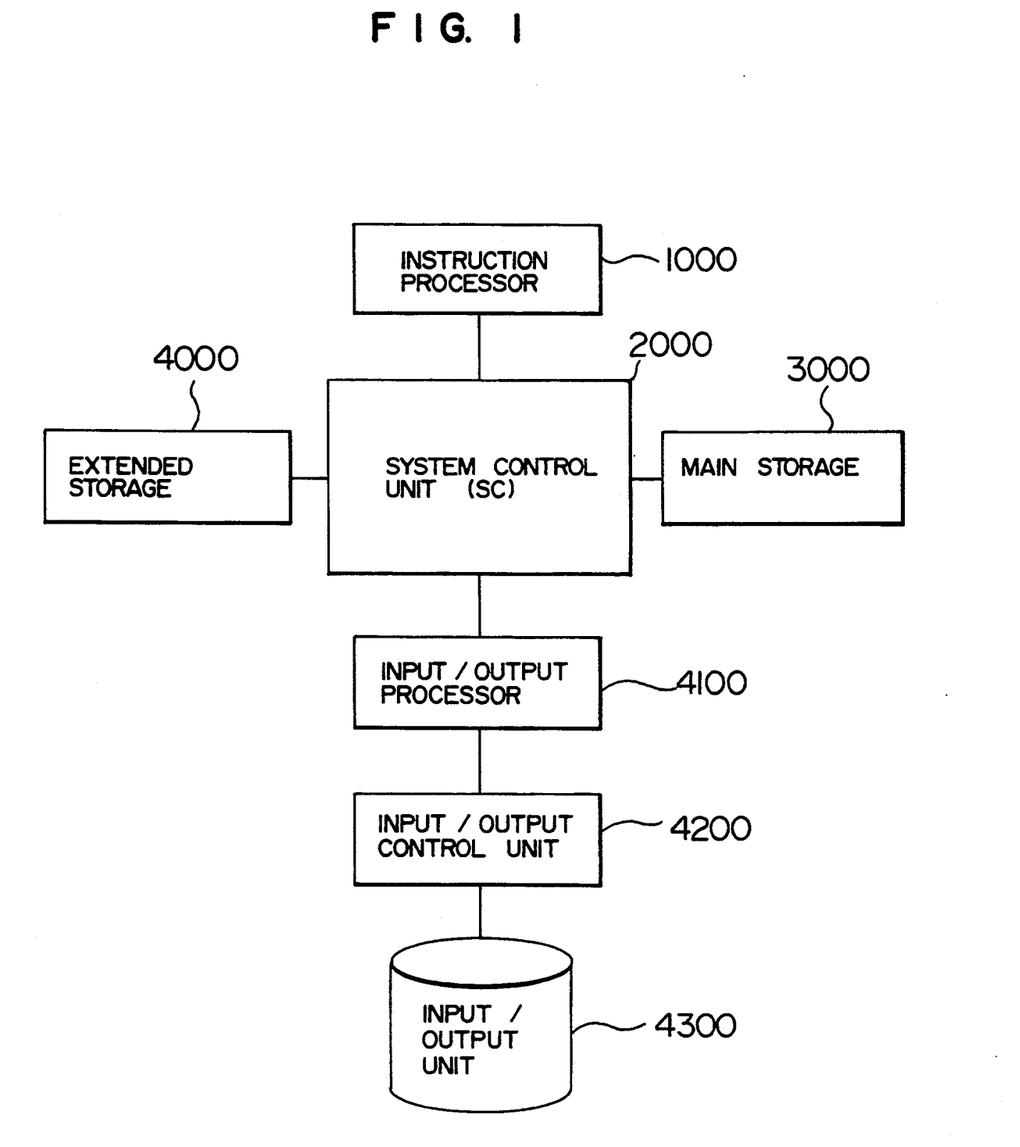
FIG. 1 is a block diagram of a computer system illustrating an embodiment of the present invention.

FIG. 1 is the whole configuration of a computer system showing an embodiment of the present invention.

The computer system of the present invention includes an instruction processor (IP) 1000, a system control unit (SC) 2000, a main storage (MS) 3000, an extended storage 4000, an input/output processor (IOP) 4100, an input/output control unit (IOC) 4200, and an input/output unit (IO) 4300. Although the drawing of FIG. 1 shows only one of these units, a plurality of them are actually provided.

Figure 2:
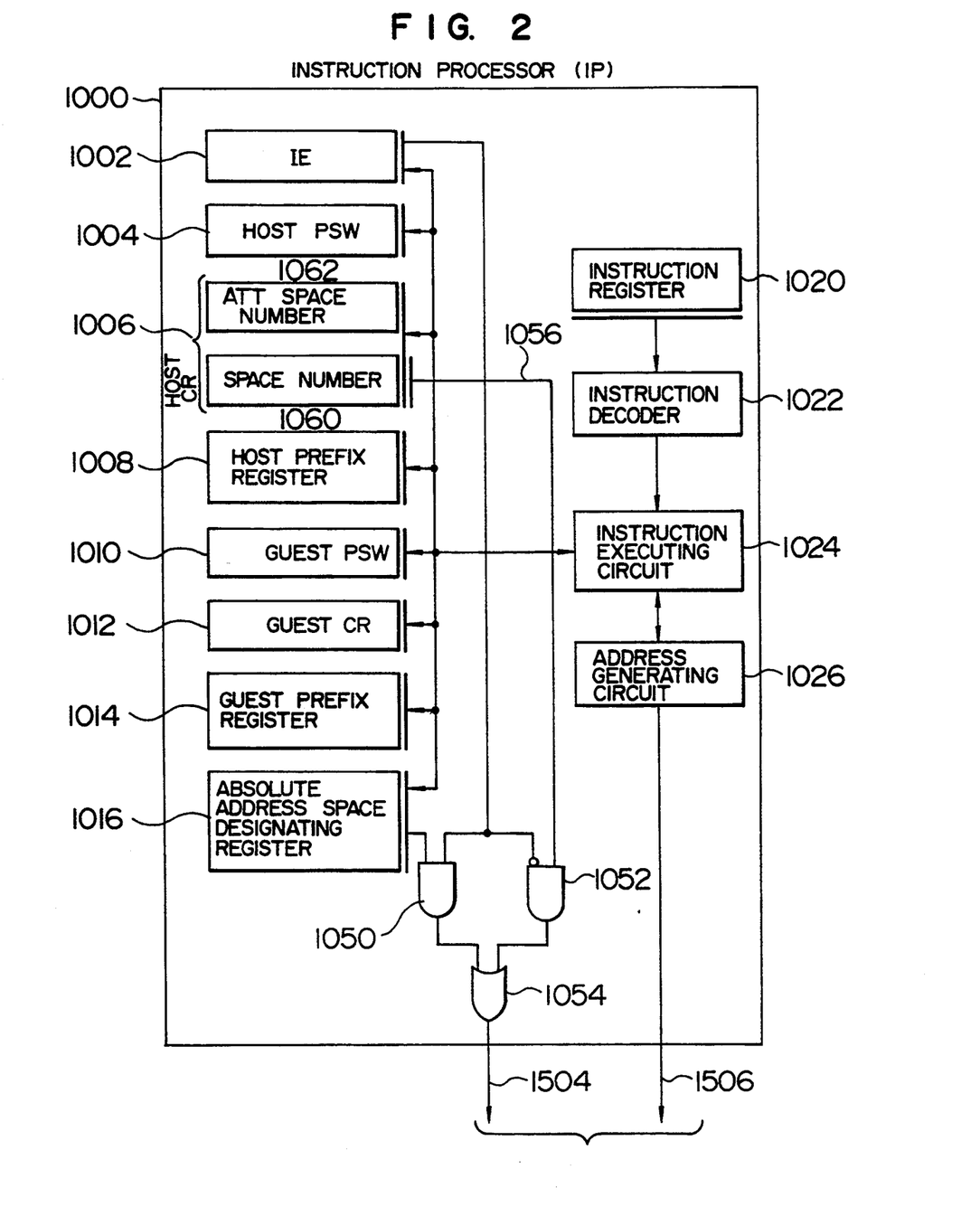
FIG. 2 is a diagram illustrating the configuration of an instruction processor shown in FIG. 1.

FIG. 2 illustrates a main portion of the configuration of the instruction processor shown in FIG. 1.

The instruction processor 1000 is provided with an instruction register 1020 for storing an instruction read out of the main storage 3000, an instruction decoder 1022 for decoding the read instruction, an instruction executing circuit 1024 for executing the decoded instruction, and an address generating circuit 1026 for generating addresses. The address generating circuit 1026 performs an address translation from a virtual address to a real address and a prefix translation from a real address to an absolute address.

As shown on the left side of FIG. 2, there are provided, as a variety of registers, a GUEST execution mode bit (IE mode bit) 1002 indicative of an execution of a VM, a HOST program status word (PSW) 1004 corresponding to the HOST, a HOST control register (HOST CR) 1006 indicating an absolute address space number and an absolute address space in which an address translation table exists (an ATT space number) to be controlled for the HOST, a HOST prefix register 1008, a GUEST program status word (GUEST PSW) 1010 corresponding to the GUEST, a GUEST control register (GUEST CR) 1012 indicative of an absolute address space for controlling the GUEST, and a GUEST prefix register 1014. Incidentally, the HOST control register 1006 includes a space number register 1060 for designating an absolute address space number and an ATT space number register 1062 for designating an absolute address space in which an address translation table, used for address translation, is stored. Of course, the space number and the ATT space number stored in the space number register 1060 and the ATT space number register 1062 can be modified by a program.

The address translation is performed in the address generating circuit 1026 by using the address translation table (ATT) existing in an absolute address space designated by the ATT space number register 1062.

The respective registers are further provided at the lowest stage thereof with an absolute address space designating register 1016.

To a signal line 1056, there is outputted the space number 1060 included in the HOST control register 1006. When the IE mode bit 1002 indicates a logical "1", contents of the absolute address space designating register 1016 is outputted to a signal line 1504 by the action of AND gates 1050 and 1052 and an OR gate 1054. Contrarily, when the IE mode bit 1002 indicates a logical "0", contents of the space number register 1060 for designating an absolute address space of the HOST control register 1006 is outputted to a signal line 1054. Incidentally, though FIG. 2 shows only one-bit portion of the AND gates 1050, 1052 and the OR gate 1054, these gates are actually provided with the number of bits necessary for designating an absolute address space. Then, a designated absolute address space number is transmitted to the system control unit (SC) 2000 through the signal line 1504. Also, an address value generated by the address generating circuit 1026 is transmitted likewise to the system control unit (SC) 2000 through a signal line 1506.

Figure 3:
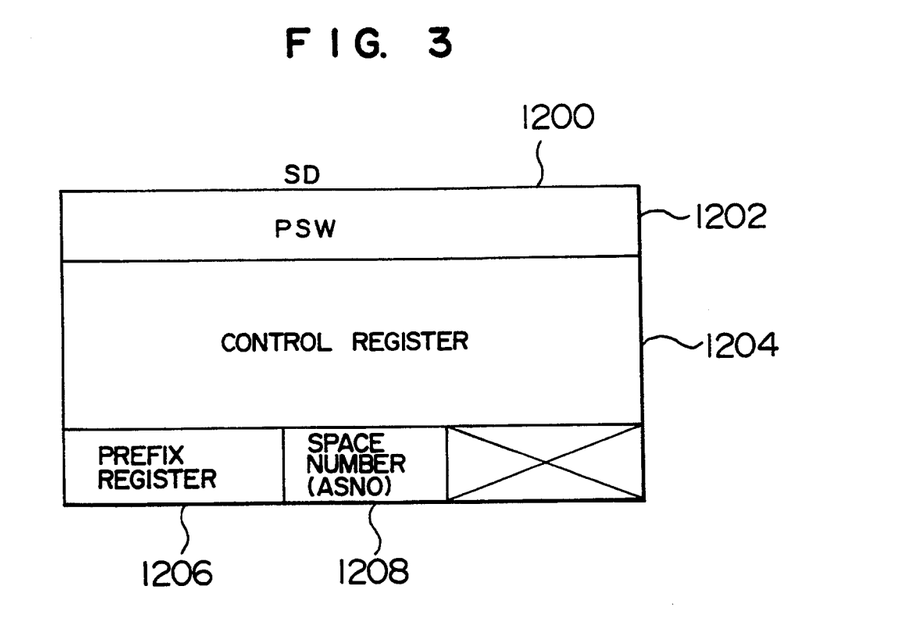
FIG. 3 is a diagram illustrating a format of a State Description stored in a main storage shown in FIG. 1.

FIG. 3 illustrates contents of a state description (SD) field related to the present invention.

Suppose now that an SIE (Start Interpretive Execution) instruction has been issued for switching to a GUEST execution mode (IE mode). The SIE instruction has, as an operand, a state description (SD) field 1200 for storing information on a GUEST on the main storage.

In the SD 1200 shown in FIG. 3, PSW field 1202 is a field for storing a GUEST program status word (PSW), a control register 1204 a field for storing a GUEST control register, and a prefix register 1206 a field for storing a GUEST prefix register. In addition to these fields, the present embodiment also provides a region 1208 for storing an absolute address space number (ASNO) which is given to a GUEST.

When the SIE instruction is issued, the IE mode bit 1002 is set to "1" indicating that the GUEST is running by the instruction executing circuit 1024 shown in FIG. 2, while the HOST PSW field 1004, the HOST control register 1006 and the HOST prefix register 1008 are loaded with contents of a HOST PSW, the control register and the prefix register, respectively. Also, the GUEST PSW field 1010, the GUEST control register 1012, the GUEST prefix register 1014 and the absolute address space designating register 1016 are loaded with contents of the PSW field 1202, the control register 1204 and the GUEST prefix register 1206, and the space number 1208, all of which have been stored in the SD 1200 which has been designated by the operand of the SIE instruction. The space number field 1208 included in the SD 1200 is loaded with an absolute address space number given to the GUEST in the IE mode or with "0" in a mode other than the IE mode. Stated another way, an OS operating in the HOST or a bare machine is provided with an absolute address space 0 (space number 0).

Figure 4:
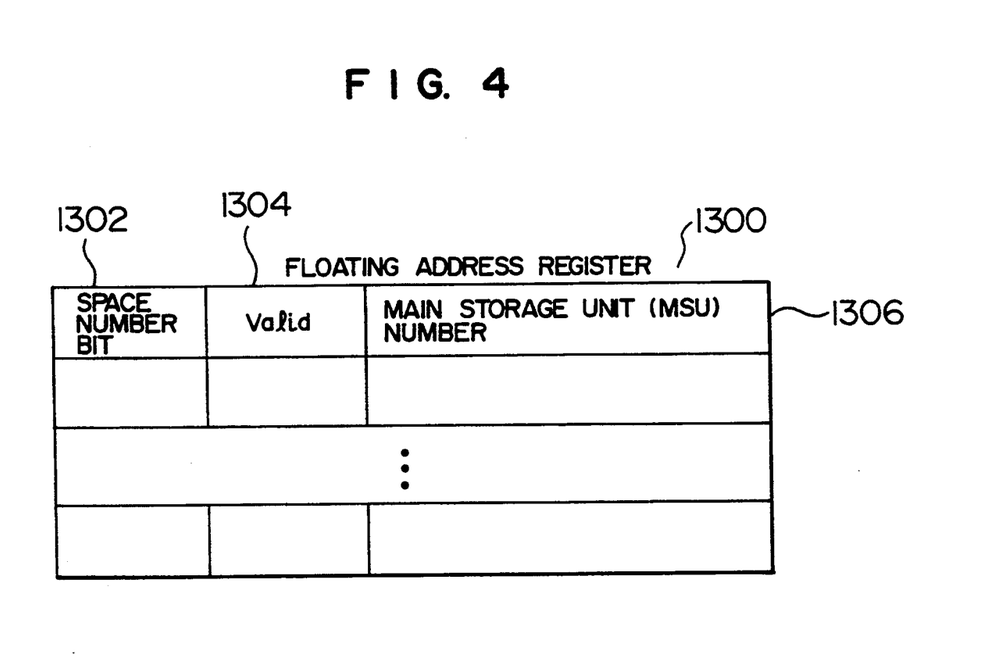
FIG. 4 is a diagram illustrating the configuration of a floating address register disposed in a system control unit shown in FIG. 1.

FIG. 4 illustrates the configuration of a floating address register disposed in the system control unit shown in FIG. 1.

A floating address register (FAR) 1300 built in the system control unit 2000, provided for establishing a correlation between an absolute address recognized by the OS and a physical substance of the main storage unit (MSU) corresponding thereto, and an absolute address space number bit 1302, a Valid bit (Valid) 1304 and a main storage unit number 1306 are stored therein as a set. This set is stored for every configuration unit of the main storage (for example, every 16 MB). This configuration unit of the main storage will be hereinbelow referred to as the main storage element (MSE).

The main storage unit (MSU) number field 1306 shown in FIG. 4 is provided for storing a physical entity of the main storage unit corresponding to a main storage element. The space number bit 1302 indicates an absolute address space number allocated to the floating address register. In the present embodiment, an absolute address space is allocated to each VM, so that the space number also serves as a VM identifier. Assuming that the number of bits given to the field of the space number bit 1302 is N, $2^N$ absolute addresses can be expressed by the space number bit 1302. Incidentally, though the present embodiment employs a floating address register for providing the absolute address spaces, another type of register may alternatively be employed as long as it can establish a correlation between an absolute address recognized by the OS and a physical entity of the main storage unit corresponding thereto.

The number of the floating address registers 1300 required in a computer system is determined by the product of (a) the number of the main storage units (MSU) in the computer system or (b) the number of the main storage elements existing in a single absolute address space (that is, the number derived by dividing the size of the absolute address space by the size of the main storage element) and the number of available absolute address spaces.

In the case (b), a capacity of the main storage unit allocated to each absolute address space is first designated in course of orderly setting the fields of each floating address register. In other words, an actual storage capacity allocated to each VM is designated. It should be noted however that the total of the allocated storage capacities should not exceed the whole capacity of the main storage unit (physical substance). After the main storage unit (MSU) has been correlated to the main storage element (MSE) of the floating address register 1300 relative to each absolute address space according to the above-mentioned instructions, a physical substance of the main storage unit correspondingly associated to a main storage element is stored in the main storage unit number field 1306 and the Valid bit 1304 is set to "1".

Figure 5:
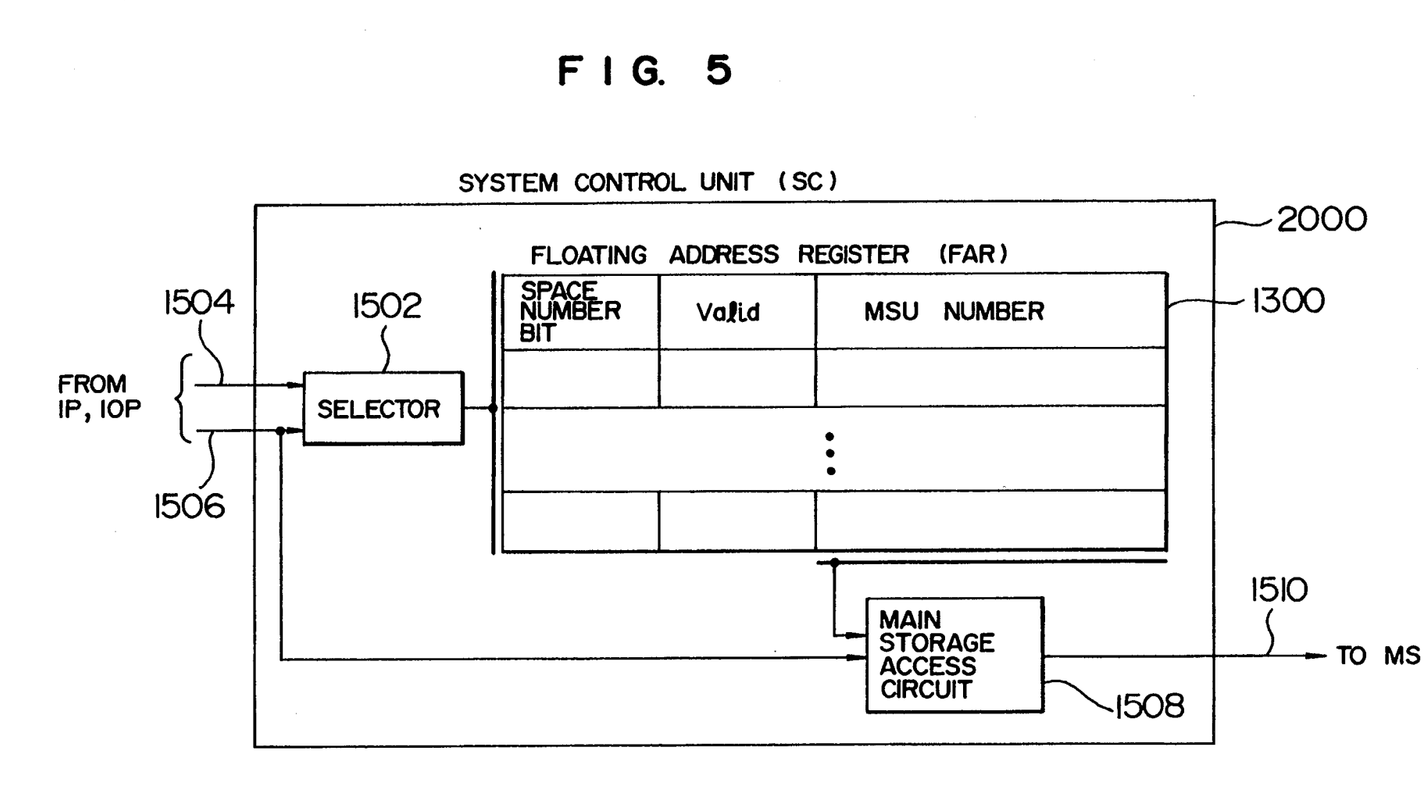
FIG. 5 is a diagram illustrating a main portion of the configuration of the system control unit shown in FIG. 1.

FIG. 5 illustrates a main portion of the configuration of the system control unit shown in FIG. 1.

The system control unit 2000 shown in FIG. 5 is supplied with a space number from the instruction processor (IP) through the signal line 1504 and an absolute address from the input/output processor through the signal line 1506 which are both inputted to a selector 1502. The selector 1502 selects a corresponding main storage element based on the space number and absolute address. By the action of the selector 1502, a main storage unit (MSU) is correlated to an access to the main storage. Then, a main storage access circuit 1508 generates an access signal based on the MSU number of a selected main storage unit and the absolute address supplied through the signal line 1506 and supplies the same to the main storage unit 3000 through a signal line 1510.

Next, explanation will be given of a Modify MSE instruction for modifying contents of the main storage unit number field 1306 included in the floating address register 1300.

Figure 6:
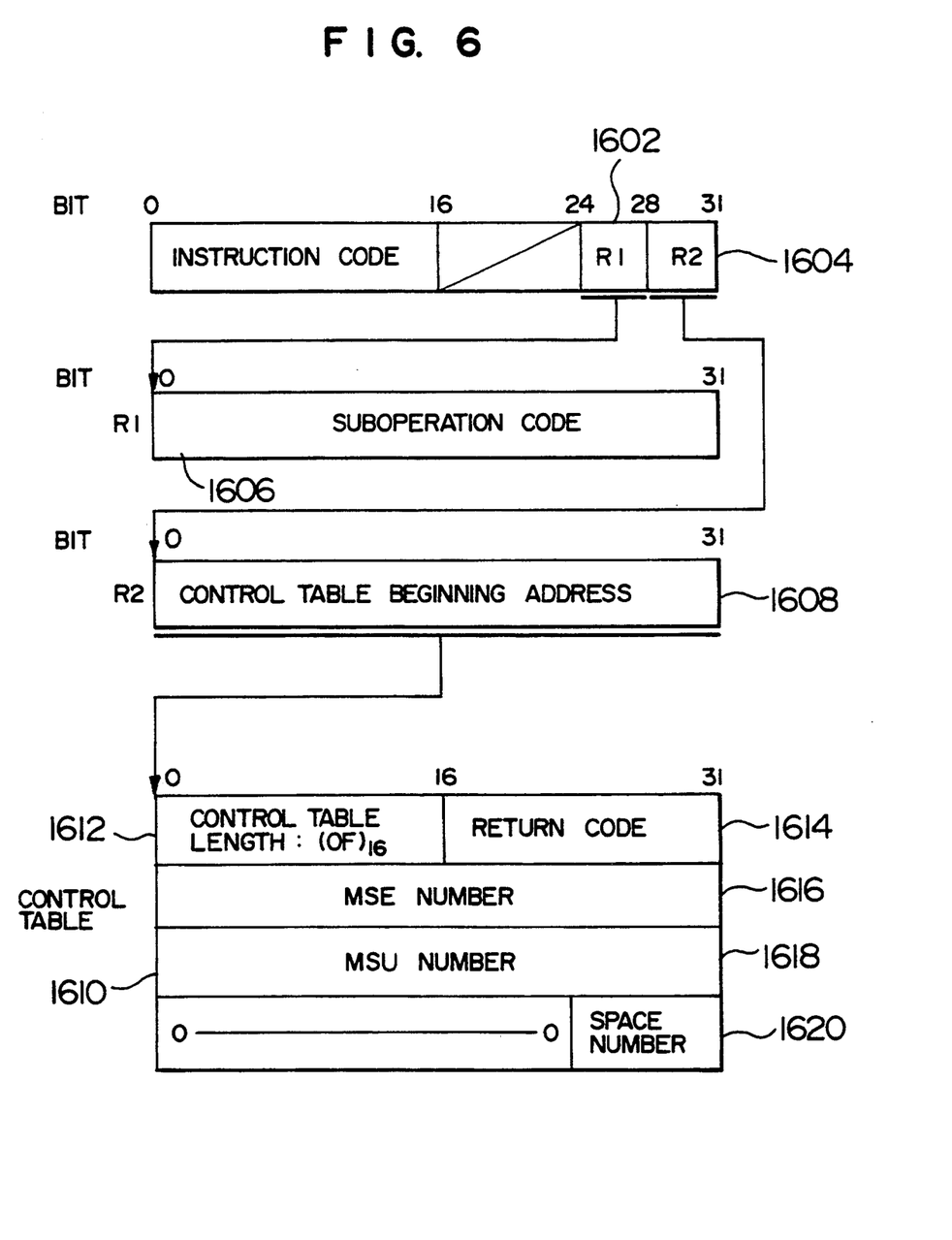
FIG. 6 is a diagram used for explaining an instruction for modifying contents of a main storage unit number stored in the floating address register shown in FIG. 4.

FIG. 6 illustrates the format of the Modify MSE instruction for modifying contents of the main storage unit number field 1306.

The modify MSE instruction has a length of 32 bits which is composed of an instruction code field (bits 0–15), an R1 field 1602 (bits 24–27) and an R2 field 1604 (bits 28–31). The R1 field 1602 is provided for designating a suboperation code 1606 which indicates contents of a general register when used by an SVP call instruction. The R2 field 1604 is provided for designating the beginning address 1608 of a control table 1610 which stores contents of the general registers. The suboperation code 1606 and the control table beginning address 1608 are both expressed by 32 bits. The control table 1610 is used to designate an objective MSE number, an MSU number to be modified, and so on.

A control table length 1612 stored in the control table 1610 is provided for designating the size of the control table (($OF)_{16}$ in this embodiment), a space number field 1620 designates an absolute address space number to be modified (that is, a VM modifier), an MSE number field 1616 designates the number of a main storage element, the MSE number of which is to be modified, and an MSU number field 1618 designates the number of a main storage unit to be modified. A return code field 1614 is provided for reporting the result of executing the Modify MSE instruction.

Figure 7:
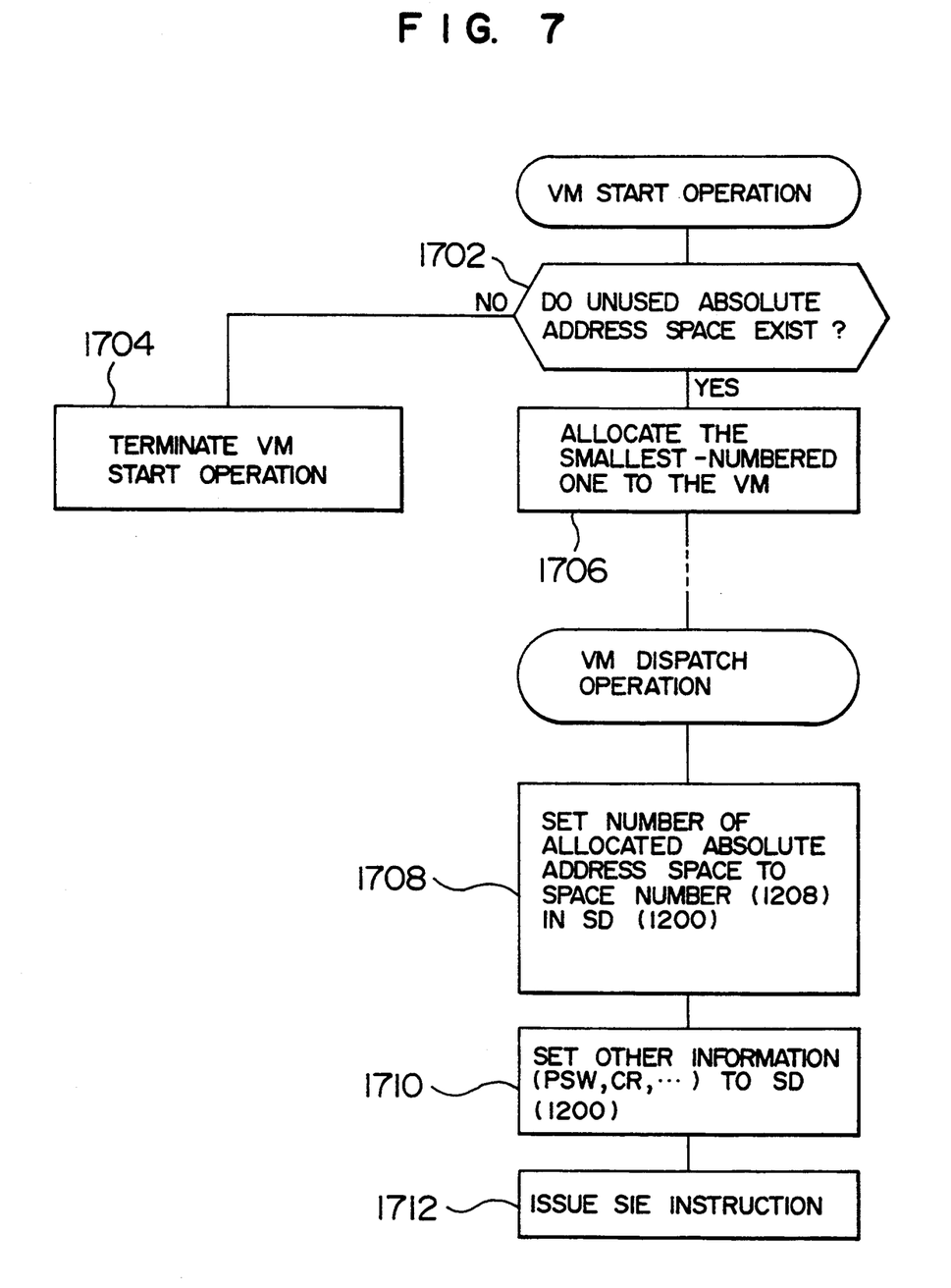
FIG. 7 is a flowchart illustrating an operation of a HOST for allocating different absolute address spaces to respective VMs.

FIG. 7 is a processing flow of the HOST for allocating different absolute address spaces to respective VMs in the VM system of the present embodiment.

Incidentally, the processing executed by the host may be implemented either by software or a VM monitor program or by hardware. First, in a start operation for the respective VM executed by the HOST, it is examined whether or not an unused absolute address spaces exist (step 1702). If no unused absolute address space exists, the VM start operation is terminated (step 1704). Contrarily, if such unused absolute address spaces exist, the one having the smallest number is allocated to the VM (step 1706). It should be noted that the absolute address space number 0 is used by the HOST itself. In a VM dispatching operation, the number of an allocated absolute address space is set to the space number field 1208 of the SD 1200 shown in FIG. 3 (step 1708), other information such as the PSW, control register and so on are set in the corresponding fields of the SD 1200 (step 1710), and then the SIE instruction is issued (step 1712).

Figure 8:
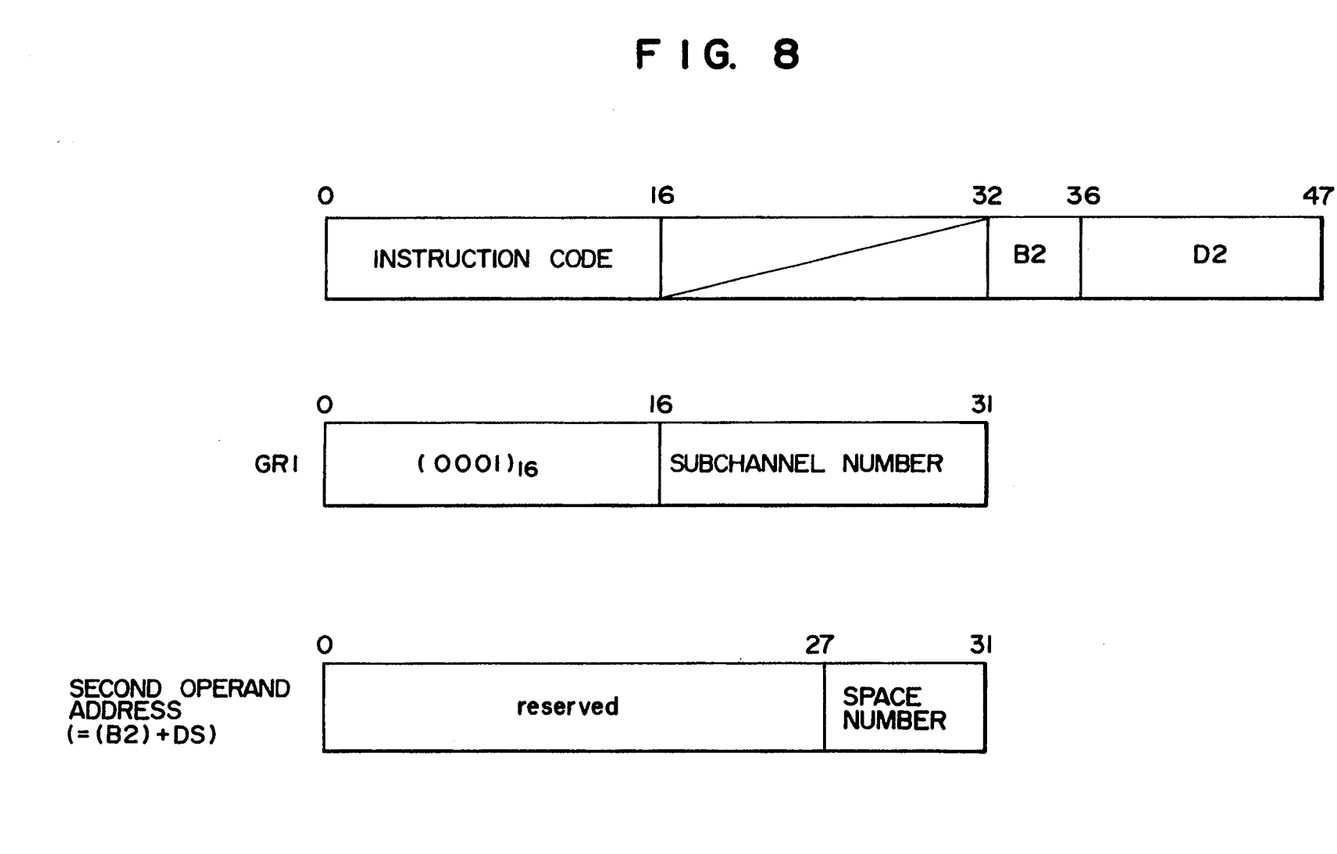
FIG. 8 is a diagram used for explaining an instruction for registering an absolute address space number used by a VM to a subchannel.

FIG. 8 illustrates the format of an SASNO (Set Address Space No) instruction for registering the space number of an absolute address space used by a VM in a subchannel.

The SASNO instruction, for registering the space number of an absolute address space used by a VM (a VM identifier) in a subchannel, has a length of 48 bits. More specifically, the SASNO instruction transfers a space number designated by a second operand address (=(B2)+(D2)) to a subchannel designated by bits 16–31 of a general register 1 (GR1). The space number of respective sub channel is set to 0 before a certain space number is transferred by the SASNO instruction. By registering the space number in a subchannel by the SASNO instruction, it is possible to specify the space number of an absolute address space used by the input/output processor for accessing to the main storage. More specifically, for executing a channel program, the input/output processor accesses the channel program stored in the main storage by using an absolute address space number set to the subchannel designated by an input/output instruction. Also, for accessing data designated by a channel command word (CCW), the input/output processor uses this absolute address space number.

Figure 9:
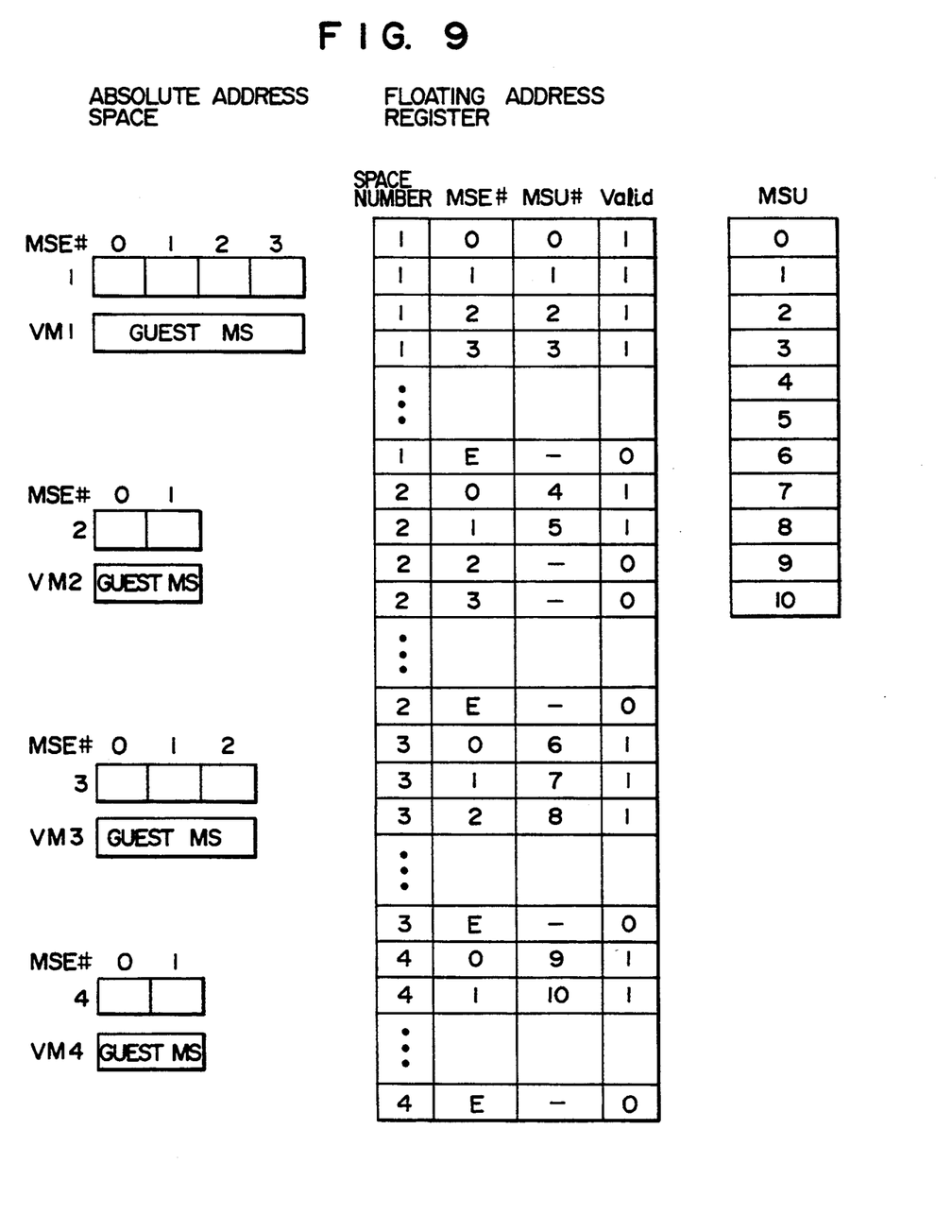
FIGS. 9 and 10 are diagrams illustrating the states of the floating address register before and after reconfiguring the main storages of the VMs.
Figure 10:
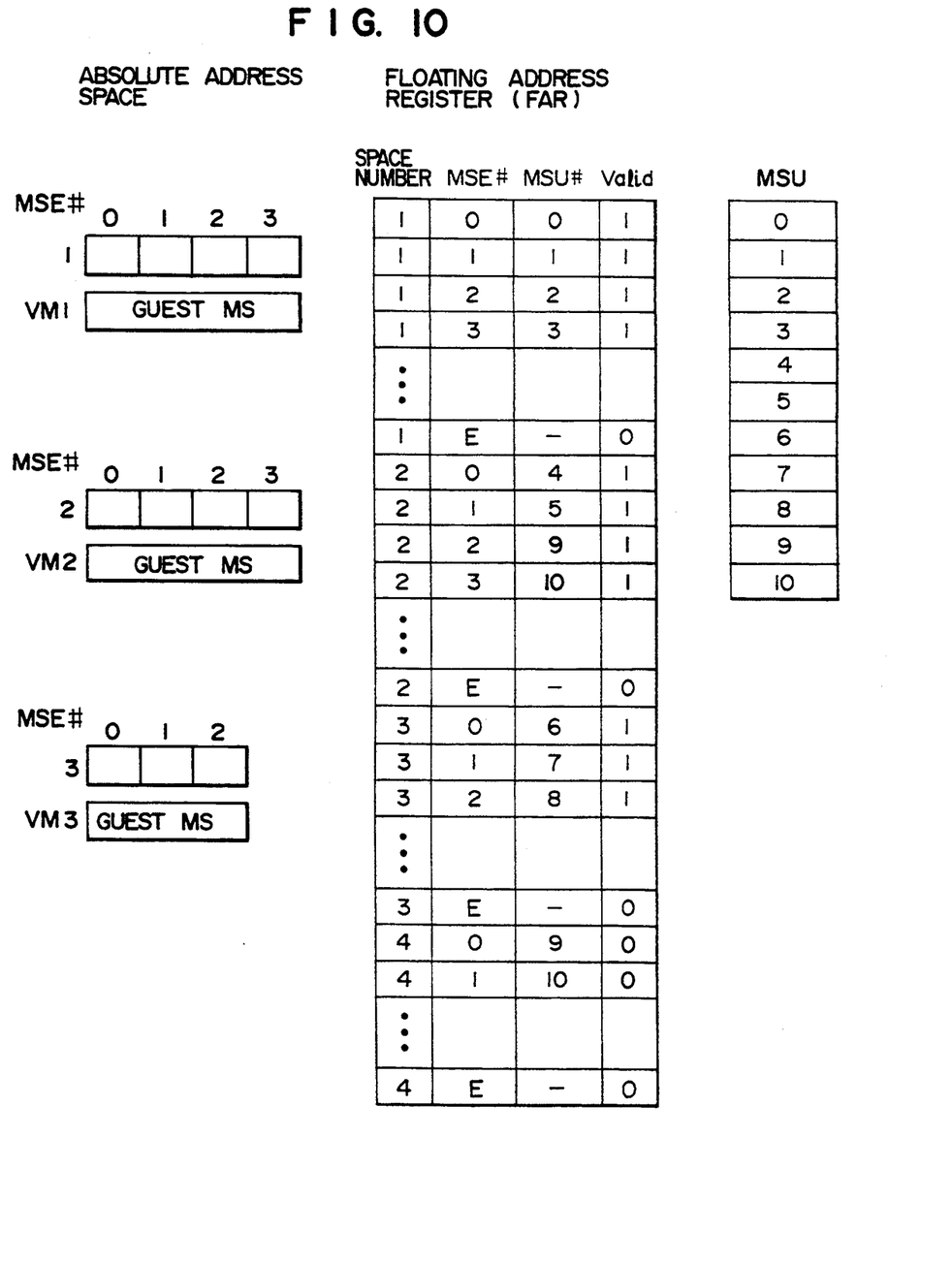

FIGS. 9 and 10 respectively illustrate states before and after the VM main storage is dynamically reconfigured.

In the state before a reconfiguration request is issued to a main storage of a VM on a computer system, suppose that the absolute address spaces, the floating address register and contents of the main storage unit are respectively in states shown in FIG. 9.

The absolute address spaces 1, 2, 3, 4 are allocated to the virtual machines VM1, VM2, VM3, VM4, respectively. Assuming that the main storage element has a capacity of 16 MB, the virtual machines VM1, VM2, VM3, VM4 are provided with 64 MB, 32 MB, 48 MB, 32 MB, respectively. The main storage units are numbered from 0 to 10. In the floating address register (FAR), there are stored sets of the space number, the MSE number, the MSU number and the Valid bit for each of the main storage elements.

Suppose now that the operation of the virtual machine VM4 has been terminated and the main storage used by the virtual machine VM4 is provided for the virtual machine VM2. For this operation, the host issues the Modify MSE instruction, whereby the Valid bits of the MSE numbers 2 and 3 of the space number 2 in the FAR are set to "1", in addition to the Valid bits of the MSE numbers 0 and 1 which had been used by the virtual machine VM2, and the Valid bits of the MSE numbers used by the virtual machine VM4, that is, the MSE numbers 0 and 1 of the space number 4 in the FAR are set to "0". The state after the reconfiguration is shown in FIG. 10. Since the operation of the virtual machine VM4 has been terminated in FIG. 10, the absolute address space 4 is not allocated. It can also be seen from FIG. 10 that the MSE numbers 2, 3 of the space number 2 in the FAR are allocated to the MSU numbers 9, 10, respectively, which therefore have the respective Valid bits set to "1". ON the other hand, the Valid bits corresponding to the MSE numbers 0, 1 of the space number 4 in the FAR are respectively set to "0" which indicates invalidity of the main storage elements 0, 1 of the space number 4.

Figure 11:
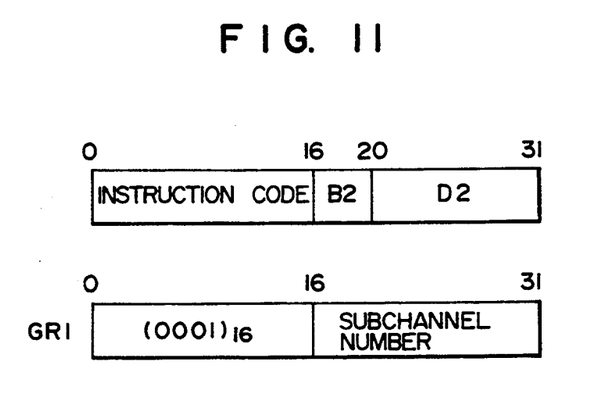
FIG. 11 is a diagram used for explaining an instruction for starting an input/output processor.

FIG. 11 illustrates the format of a SSCH (Start Subchannel) instruction which is an input/output start instruction. The SSCH instruction has a length of 32 bits as shown in the upper drawing of FIG. 11. A subchannel number is stored in a part of the general register 1 (GR1). The SSCH instruction designates a subchannel by a combination of bits 16–31 of the general register 1 (GR1) and transfers to the designated subchannel an operation request block (ORB) 1800 stored in a field (B2)+(D2) on the main storage indicated by the second operand.

Figure 12:
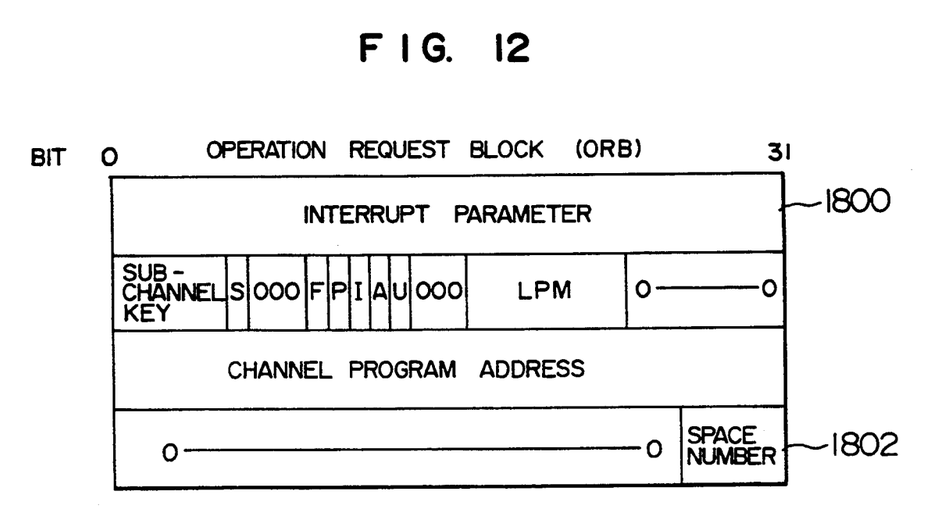
FIG. 12 is a diagram used for explaining an operation request block which is an operand of the instruction for starting the input/output processor.

FIG. 12 illustrates the format of the operation request block (ORB) stored in the main storage.

The operation request block is composed of a variety of information necessary for executing an input/output operation, as shown in FIG. 12. A space number field 1802 in the operation request block is used to designate an absolute address space used for the input/output operation. If no absolute address space is designated by the space number field 1802, the space number 0 used by the HOST is supposed. In the operation request block 1800, there are stored an interrupt parameter, a subchannel key and a channel program address.

Figure 13:
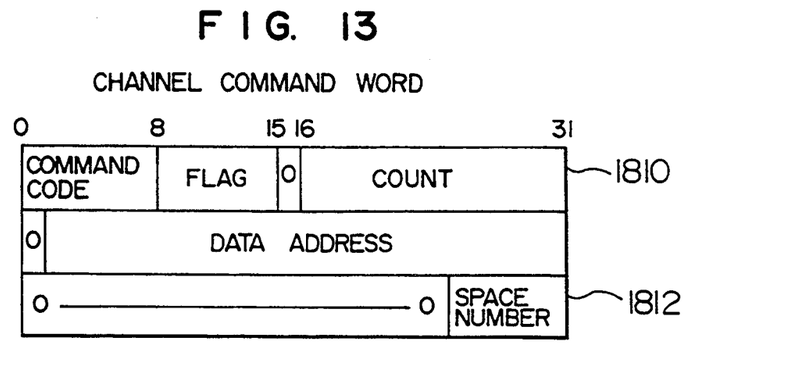
FIG. 13 is a diagram used for explaining a channel command word stored in the main storage.

FIG. 13 illustrates the format of a channel command word (CCW) stored in the main storage.

The CCW 1810 designates an absolute address space used thereby with a space number field 1812. If no absolute address space is designated by this space number field 1802, the number 0 used by the HOST is set thereto.

In a sequence of CCWs, it is possible to use different absolute address spaces by modifying the space number 1812 of the respective CCWs. When the space number designated by the space number field 1802 of the operation request block is different from that designated by the space number field 1812 of the CCW, the latter has priority to the former.

Since each VM is provided with a different absolute address space as described above, V=R VM is satisfied for all the VMs, whereby a constant added to a given address for accessing, that is, the address constant for the resident VM is not necessary.

According to the present invention as described above, different absolute address spaces are allocated to the respective VMs, so that when a main storage of a VM is dynamically reconfigured, a storage region allocated to a VM which is not related to the reconfiguration need not be moved on the absolute address space.

It is claimed:

1. A multiple absolute address space configuring apparatus for a virtual machine system adapted to simultaneously operate a plurality of virtual machines on a single real computer having a main storage unit including a plurality of absolute address spaces, comprising:

means for establishing a correlation between an absolute address and a physical substance of the main storage unit, said means being provided so as to store information corresponding to each absolute address space, wherein said means for establishing a correlation includes a floating address register for registering therein a set of an absolute address space number, a valid bit indicating that said space number is valid, and a main storage unit number corresponding to said space number.

2. The multiple address space configuring apparatus according to claim 1, including means for modifying contents of said means for establishing a correlation between an absolute address and a physical substance of the main storage unit, said modifying means including, a means for designating an absolute address space number to be modified, a configuration unit composed of a main storage element corresponding to said absolute address space number, and a physical substance number of the main storage element, using a general register designated by a part of a service processor call instruction and a control table included in contents of said general register.

3. A computer system comprising:
a processor which-can execute a plurality of operating systems under management of a control program, said processor comprising a first register holding an identifier for identifying an absolute address space allocated for said control program, a second register holding an identifier for identifying an absolute address space allocated for a specific operating system executed by said processor, an address generating circuit for generating an absolute address in accordance with an instruction from said control program or the specific operating system in an executed state, a third register holding control information indicating whether or not said processor is executing said control program, and selecting means for outputting one of the identifiers held in said first and second registers in accordance with the control information held in said third register;
a storage apparatus including a plurality of storage units having unit numbers for identification, respectively; and
a control apparatus connected between said processor and said storage apparatus, said control apparatus including a control table holding information corresponding to each absolute address space of the respective ones of the plurality of operating systems to an associated one of said plurality of storage units, and means for referring to said control table and accessing said storage apparatus based on the outputs of said address generating circuit and said selecting means.

4. The computer system according to claim 3, wherein said address generating circuit includes means for translating a logical address instructed from said control program or said operating system into said absolute address.

5. The computer system according to claim 3 wherein said control table includes an identifier for identifying each of the absolute address spaces, a unit number of at least one storage unit allocated for said each absolute address space, and a flag indicating whether or not the corresponding absolute address space is valid.

6. The computer system according to claim 5 wherein said control apparatus further comprises means for dynamically changing the unit number made to correspond to the absolute address space instructed by said control table.

7. The computer system according to claim 6 wherein said processor issues an instruction including an identifier of the absolute address space to be changed and a unit number made to correspond thereto.

* * * * *